June 25, 1968
H. I. TETER
3,389,757
PIPE CASING DRIVING MACHINE
Filed Oct. 24, 1965
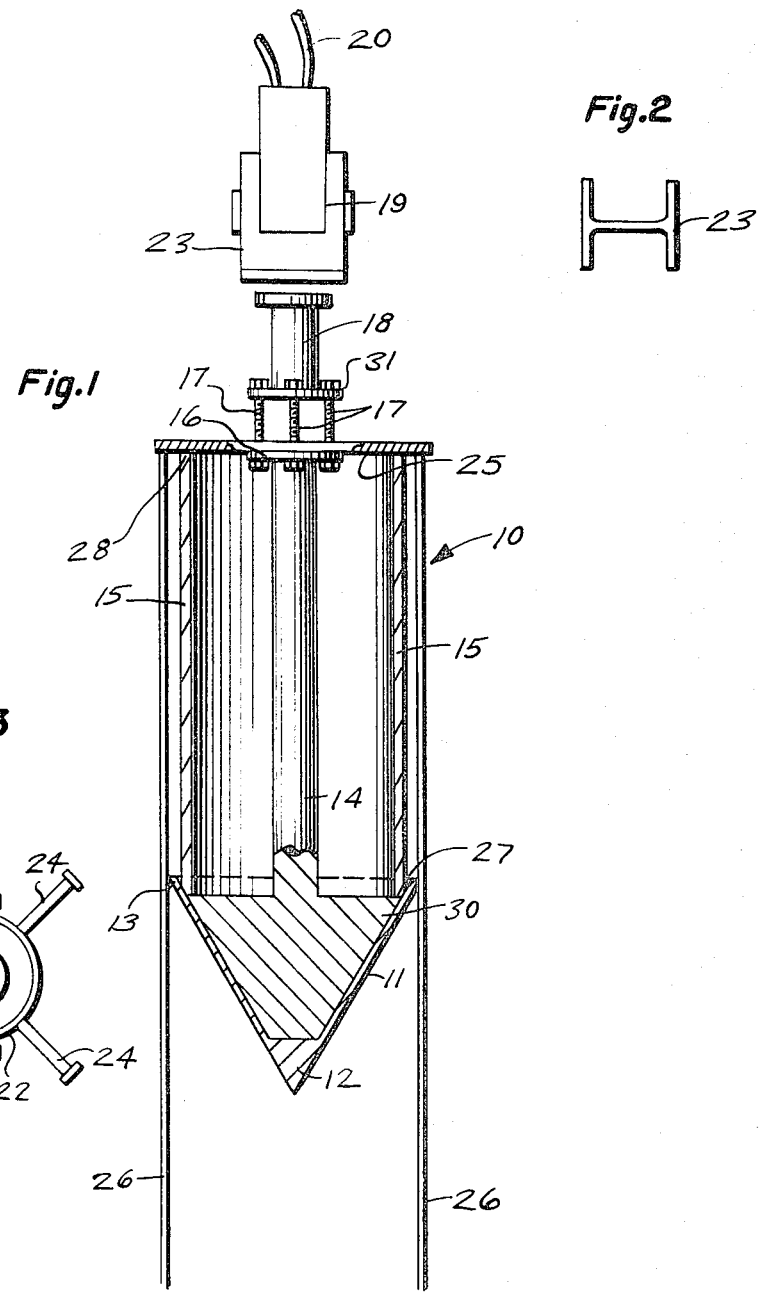
INVENTOR.
Harry I. Teter

United States Patent Office 3,389,757
Patented June 25, 1968

3,389,757
PIPE CASING DRIVING MACHINE
Harry I. Teter, Rte. 1, Box 9, New Ringgold, Pa. 17960
Filed Oct. 24, 1965, Ser. No. 504,758
2 Claims. (Cl. 175—22)

ABSTRACT OF THE DISCLOSURE

A machine for driving a pipe casing, the machine including a conical driving head of solid metal against the rear end of which a pipe casing may be positioned, the opposite end of the pipe casing being secured by a plate fastened to one end of a shaft that is enlarged at its other end to form a solid metal filler for the conical driving head. In summary, a driving force from a hammer toward the plate is transmitted through the shaft to the driving head at the opposite end of the shaft.

---

This invention relates to pipe driving arrangements, and more particularly to a pipe casing driving machine used for driving pipe casing under highways and railroads for gas, oil and water supply lines.

Another object of this invention is to provide a pipe casing driving machine which is driven by an air compressor and is adapted to be moved to a new site by cables attached to the tractor.

Another object of this invention is to provide a pipe casing driving machine wherein the driving point of said machine is adapted to protect the front end of the driven pipe during the driving operation.

Another object of this invention is to provide a pipe casing driving machine, a portion of which can be removed in order to accommodate a connecting pipe section to the previously positioned pipe section.

A still further object of this invention is to provide a pipe casing driving machine which features outstanding safety features and provides maximum utility to its user.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

FIGURE 1 is a vertical view of this invention shown in elevation and partly in section.

FIGURE 2 is an end view of the beam that holds and guides the air hammer.

FIGURE 3 is a plan view of a shaft support.

According to this invention, pipe casing driving machine 10 is provided with a conical driving head 11, preferably made out of steel, which terminates at a hardened driving point 12. The end 13 of driving head 11 is adapted to accommodate and secure therein front section 27 of tubular steel pipe 15 during the pipe driving operation under a highway or a railroad. Solid steel shaft 14 is integrally connected with the metallic filler 30 of driving head 11. The other end of shaft 14 is welded to flange 16 which is, in turn, secured to cylindrical steel plate 25 and another flange 31 which supports short shaft 18. Flange 16 is removably secured to plate 25 and flange 31 by means of a bolt and nut arrangement 17 as shown in FIGURE 1. An I-beam 23 is suspended on air hammer 19 and is capable of guiding said air hammer 19 on short shaft 18 thereby providing driving power for cylindrical plate 25, which in turn, is capable of driving steel pipe 15 through the soil. Air hammer 19 is provided with air hose 20 which is connected to an air compressor (not shown) for providing driving power to the air hammer. Shaft 14 is supported by a clamp arrangement 22 which, in turn, is secured to radially extending guides 24. Bolts and nuts 21 hold clamp arrangement 22 secure to shaft 14 thereby positioning said shaft in a truly longitudinal position.

Looking now at the drawing, one will see that shaft 18 and plate 25 can easily be removed from the rear section of steel section 28 of pipe 15 and another piping section may be added to pipe 15 in a manner which was previously described.

It will also be noted that cables 26 may be attached to plate 25 for transporting this pipe driving machine to another site by means of a tractor.

What I now claim is:

1. A pipe casing driving machine for driving pipe casing beneath highways and railroads for gas, oil or water lines, said pipe casing driving machine comprising a driving head means, a cylindrical plate removably attached to said driving head means, a pipe casing secured to said plate and said driving head means, a driving shaft removably attached to said plate and adapted to drive said driving head means, said machine further including an air hammer means for providing impact upon said driving shaft, said driving head means including a steel driving head of conical configuration, a metallic filler within said driving head, a solid steel shaft having one end integrally connected with said filler, the other end of said shaft being connected to a flange for positioning and securing said shaft against said cylindrical plate, the uppermost region of said driving head being adapted to admit the front end of said pipe, said shaft being provided with a removable clamp enclosing said shaft, radially extending guides secured to said clamp for supporting said shaft against the inner portion of said pipe, and said steel driving head being of larger diameter than said pipe whereby the forward end of said pipe is in abutment with a rear side of said driving head.

2. A pipe casing driving machine for driving pipe casing under highways and railroads for gas, oil and water lines, comprising driving head means, a cylindrical plate removably attached to said driving head means, a pipe casing secured to said plate and said driving head means, a driving shaft removably attached to said plate and adapted to drive said driving head means and said pipe into and through the ground, and air hammer means for providing impact on said driving shaft, said driving shaft including a short shaft, a cylindrical flange welded to the bottom portion of said short shaft and having a plurality of openings, bolt means to secure said short shaft and said flange to said plate in a spaced relationship.

References Cited

UNITED STATES PATENTS

| 49,362 | 8/1865 | Barnes et al. | 175—22 |
|---|---|---|---|
| 1,173,806 | 2/1916 | Johnson | 61—73.72 |
| 2,823,898 | 2/1958 | Bankston | 175—22 |
| 2,972,871 | 2/1961 | Foley | 175—19 X |
| 3,145,541 | 8/1964 | Binnings | 61—53.72 |

FOREIGN PATENTS

| 375,148 | 5/1923 | Germany. |
|---|---|---|
| 156,093 | 9/1956 | Sweden. |

ERNEST R. PURSER, *Primary Examiner.*